Feb. 3, 1959    R. W. BRINGELSON ET AL    2,871,627
LENS EDGING MACHINE
Filed May 22, 1957    6 Sheets-Sheet 1

FIG 1

INVENTORS
ROY W. BRINGELSON
EDGAR M. KATZENBERG
BY
CORBETT, MAHONEY & MILLER, ATTYS.

BY [signature]

FIG. 3

INVENTORS
ROY W. BRINGELSON
EDGAR M. KATZENBERG
BY
CORBETT, MAHONEY & MILLER, ATTYS.

United States Patent Office 2,871,627
Patented Feb. 3, 1959

2,871,627

LENS EDGING MACHINE

Roy W. Bringelson, Homewood, Ill., and Edgar M. Katzenberg, Columbus, Ohio, assignors to Robinson-Houchin, Inc., Columbus, Ohio, a corporation of Ohio Application May 22, 1957, Serial No. 660,969

15 Claims. (Cl. 51—127)

This invention relates to a lens edging machine. It has to do, more particularly, with an abrading machine which is fully automatic to operate on the edge of a rough lens blank to produce a finished edge of a predetermined nature, that is beveled or flat, on the blank and to simultaneously form the blank into the desired outline.

With most machines which are in use at the present time, it is necessary to first take the rough lens blank, score it with a glass cutting tool roughly in the desired outline of the finished blank, but of somewhat greater size, remove the excess glass by chipping it from the edge back to the score line with a hand tool, and then placing the rough blank on the machine to finish the edge by further removal of material to produce the final outline and type of edge.

It is the main object of this invention to provide a lens blank edging machine which is fully automatic to perform in one continuous operation the edging of the lens blank from a rough oversize blank to the finished blank which will be of a preselected outline and size and which will have an edge of a predetermined nature.

Another object of this invention is to provide a lens blank edging machine of the type indicated above which can be easily and quickly adjusted to produce edges on the finished blank of various natures, for example, bevel edges for minus or plus lens to be inserted in frames, or flat edges for the rimless type of lenses.

Another object of this invention is to provide a lens blank edging machine of the type indicated above which not only is automatic in operation but is capable of high speed operation without undue wear on parts so that the edging operation can be performed efficiently and quickly and, therefore, economically.

Still another object of this invention is to provide a machine which, as indicated above, is fully automatic requiring practically no attention by the operator.

Another object of this invention is to provide a lens blank edging machine of the type indicated which will reproduce on the blank an outline pattern with high accuracy and will form the edge of the blank with high accuracy to produce an edge of preselected cross-sectional shape.

Various other objects will be apparent from the following description and the drawings.

According to this invention, there is provided a flat abrading wheel which is supported for rotation about its axis, preferably although not necessarily being horizontally disposed. This wheel is driven by an independent electric motor. The wheel is drive which includes an electric motor. The wheel is preferably a diamond wheel although other types of abrading wheels or stones may be used. The greater area of the surface of the wheel is flat for engaging the edge of the lens blank, which will be supported in a plane at right angles to the face of the wheel, to reduce it to the proper size and outline. However, at intervals from its circumference radially inwardly the flat face surface of the wheel is provided with grooves of circular outline and of predetermined cross-section, all surfaces of which are also abrasive surfaces. If the lens blank is for rimless lenses, the machine is so adjusted that the edge of the blank will not enter any of the grooves during the edging operation. However, if the lens blank is to be mounted in a frame, and therefore, its edge is to be beveled, the machine is set so that near the completion of the edging operation, the lens blank will drop into a selected groove which will form the required bevel thereon.

The machine includes a head which carries a lens chuck for gripping the lens blank and holding it in a plane at right angles to the flat face of the wheel. On the head is driving means, driven by an independent electric motor, for rotating the lens blank about its axis. The head is pivotally supported for movement in a vertical plane to move the axis of the lens blank towards and away from the wheel under the control of a pattern of preselected outline and size. The pattern is also carried by the head and is driven by the same drive which drives the lens blank so that its rotation about its axis will be synchronized with the rotation of the lens blank about its axis.

In order to traverse the lens blank radially inwardly across the selected area of the face of the wheel, traversing mechanism driven by an independent electric motor is provided for slowly moving the entire head and the pattern and lens blank carried thereby in the direction required to move the lens blank substantially radially inwardly towards the center of the wheel. If the lens blank is to have its edge beveled, the traverse mechanism is adjusted so that it will function only until the edge of the lens blank is over the selected groove in the face of the wheel in which it is to be beveled. At that time, the pattern follower will be so controlled as to permit the head to swing downwardly to such an extent that the edge of the lens blank will enter the beveling groove and be beveled therein still under the control of the pattern so as to maintain the outline of the lens blank while its edge is being beveled into the desired cross-section. After a predetermined period of beveling in the groove, a solenoid control is actuated to swing the head upwardly so as to raise the edge of the lens blank out of the groove and away from the wheel and to deenergize all of the electric circuits of the machine except that which controls the drive for the wheel. Then the finished lens blank can be removed from the machine.

If a rimless lens blank is to be edged, the machine functions exactly as above except that the controls for the pattern follower are so adjusted as to prevent the head from swinging downwardly when it is over any of the grooves and the edge of the lens blank is, therefore, prevented from dropping into a groove and is finished only by the flat surface of the face of the abrading wheel, being moved to a predetermined position thereon.

The preferred embodiment of this invention is illustrated in the accompanying drawings wherein similar characters of reference designate corresponding parts and wherein.

Figure 1:
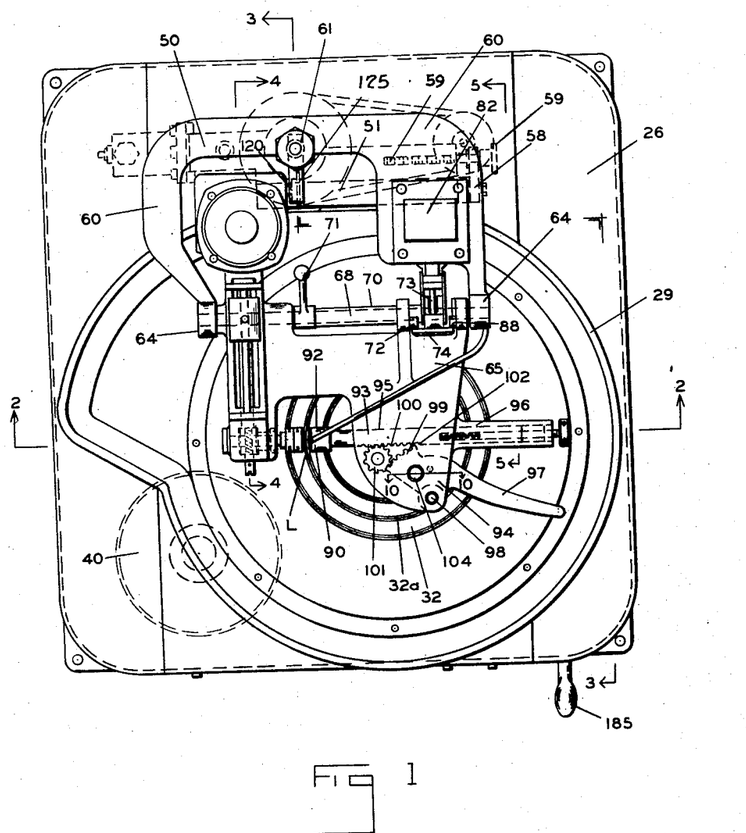
Figure 1 is a plan view of a lens blank edging machine in which this invention is embodied.
Figure 2:
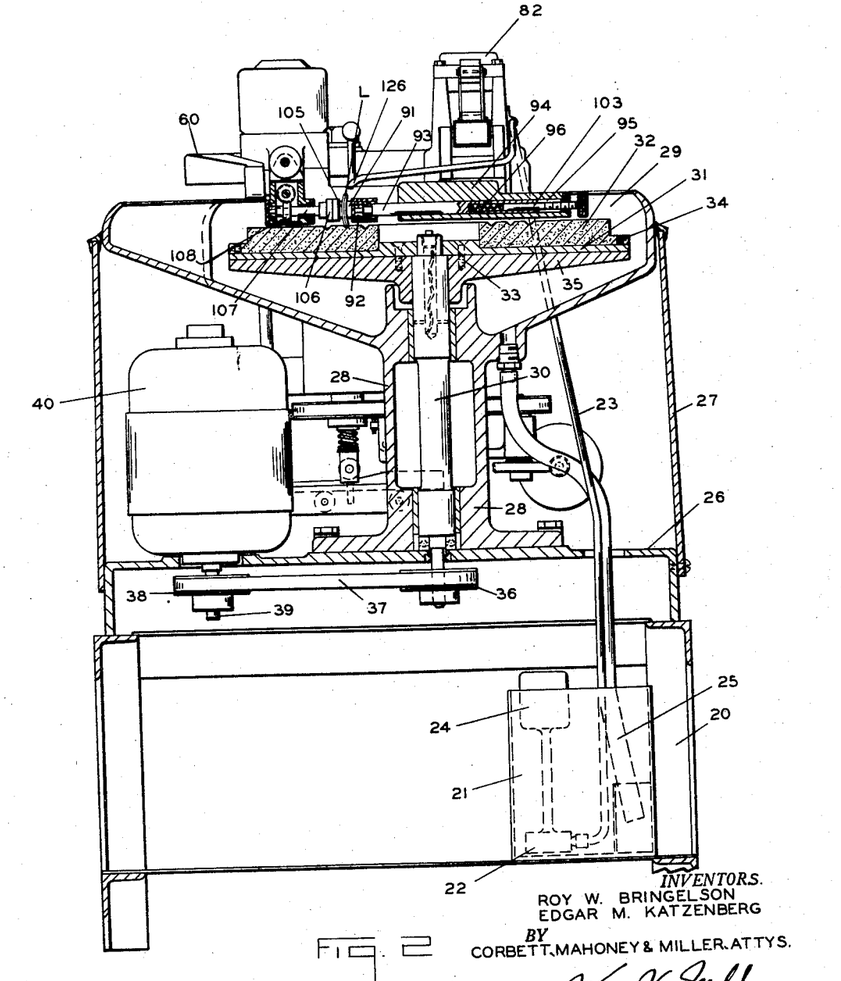
Figure 2 is a vertical sectional view of the machine shown in Figure 1, taken along line 2—2 of Figure 1.
Figure 3:
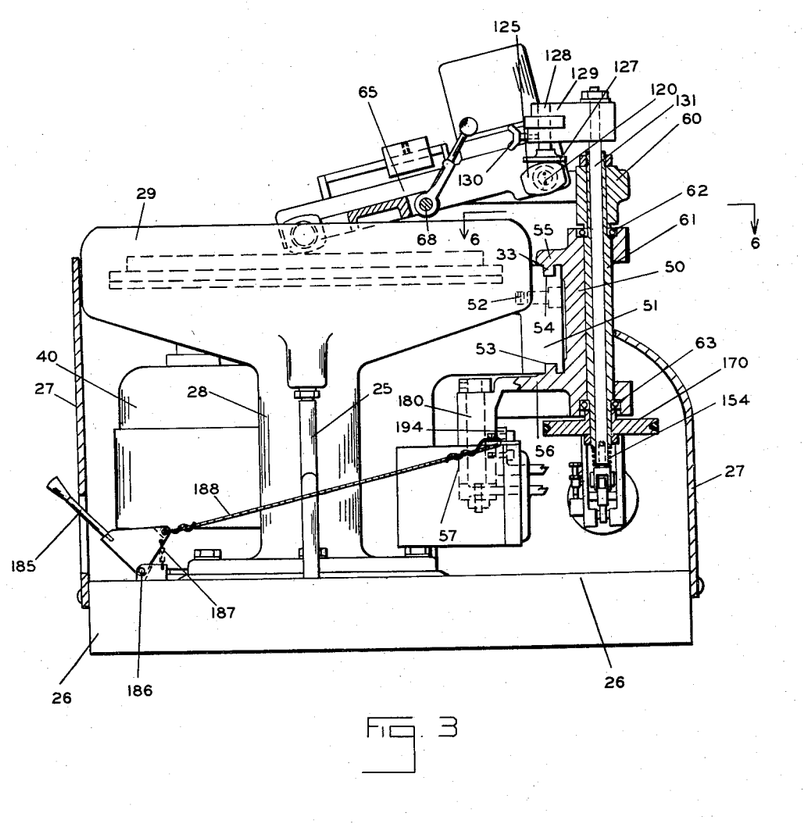
Figure 3 is a vertical sectional view of the machine of Figures 1 and 2, taken along line 3—3 of Figure 1.

With reference to the drawings, there is illustrated in Figures 1 to 3, inclusive, the general structure of the machine of this invention. In the machine shown in these figures, the abrading wheel is rotated in one plane and the lens blank is rotated in a plane at right angles thereto and is moved towards and from the wheel under control of a pattern. The abrading wheel is shown mounted for rotation about a vertical axis in a horizontal plane but it is to be understood that the machine is not limited to having the abrading wheel in a horizontal position.

The entire machine is preferably supported on an upstanding table 20 which is shown in Figure 2. This table 20 may support underneath the top thereof a tank or sump 21 for a suitable liquid coolant. A pump 22 is provided within the tank for pumping the coolant through a pressure supply line 23, this pump being driven by an electric motor 24. The coolant is returned to the tank 21 by a return drain line 25.

The main units of the machine are carried on a hollow but flat base 26 which is adapted to rest on the table 20 or other suitable support. Upstanding from this base 26 is a housing 27 which encloses the lower portion of the machine. Upstanding from the base 26 is a vertical pedestal 28 which is bolted thereto and which has the coolant-receiving bowl 29 formed on its upper end. Extending upwardly through the pedestal 28 is the wheel-supporting spindle 30 which has fixed on its upper end a wheel-supporting plate 35 that is horizontally disposed. In superimposed relationship with the plate 35 is the back-up plate 31 which carries the abrading wheel 32. This abrading wheel is of annular flat form and surrounds the hub part of the plate 31. The back-up plate 31 is attached to the support plate 35 by means of the anchoring screws 33 which are extended through the hub section of the plate 31 and are threaded into the support plate 35 adjacent the center thereof. At the circumferential edge of the wheel 32, leveling screws 34 are threaded through the reduced edge of the wheel into contact with the back-up plate 31 adjacent its peripheral edge. These screws merely engage the upper surface of the plate 31 and it will be apparent that by properly adjusting the screws, the wheel 32 may be raised relative to the top surface of the back-up plate 31 so as to provide means for exactly leveling the upper abrading surface of the wheel 32. The abrading wheel 32 is preferably of the diamond type so that it will quickly abrade the edge of the lens blank and can be rotated at high speeds without undue wearing. However, when it needs to be replaced, this can be accomplished with ease.

Obviously, the wheel 32 will be supported on the spindle 30 at such a level that it will be down within the coolant-receiving bowl 29 which will be of substantially greater area than the wheel. The sides of the bowl will be turned inwardly to prevent the coolant from rolling outwardly and upwardly over the edge thereof. The line 25 for returning the coolant to the tank 21 is connected to the bottom of the bowl as indicated in Figure 2.

The spindle 30 is rotatably supported within the pedestal 28 by suitable bearings and extends downwardly into the hollow base 26 as shown in Figure 2. The lower end of the spindle 30 has keyed thereon a pulley 36 which receives an endless belt 37 that passes around a pulley 38 keyed on the lower end of the drive shaft 39 of the electric motor 40. The motor 40 is supported on the upper surface of the base 26 with its drive shaft 39 vertically disposed and extending downwardly into the hollow base 26. Thus, the base 26 encloses the belt and pulley drive for the abrading wheel 32.

Figure 12:
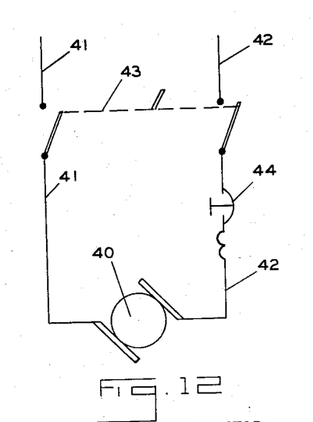
Figure 12 is a diagrammatic view of the circuit which controls only the abrading wheel drive.

The electric circuit for the abrading wheel drive may be a simple circuit as shown in Figure 12. Power for the motor 40 is received from the lines 41 and 42 controlled by a single-throw double-pole main switch 43. One of the lines, for example the line 42, between the switch 43 and the motor 40, preferably includes an emergency stop switch 44 which is normally closed but which can be broken in an emergency.

As previously indicated, the lens blank is to be supported for rotation in a vertical plane at right angles to the plane of the wheel 32 and with its edge in contact therewith and a pattern is to be supported in association with the lens blank for rotation in synchronism therewith. To properly support the lens blank and the pattern as indicated, the vertically disposed supporting standard 50, as shown in Figures 1 and 3, is provided at the rear side of the machine. This standard 50 is mounted for transverse movement of the machine on the rear side of the bowl 29 by means of a mounting or guide plate 51 which is bolted to the bowl by bolts 52. The top and bottom edges of the plate 51 are provided with slide grooves 53 and in these grooves the sliding keys 54 are provided, these keys being carried by the respective inwardly extending upper and lower flanges 55 and 56 provided on the standard. Formed integral with the flange 56 of the standard 50 at the forward edge thereof is a depending pivot sleeve 57 which is provided for a purpose to be described later.

Figure 7:
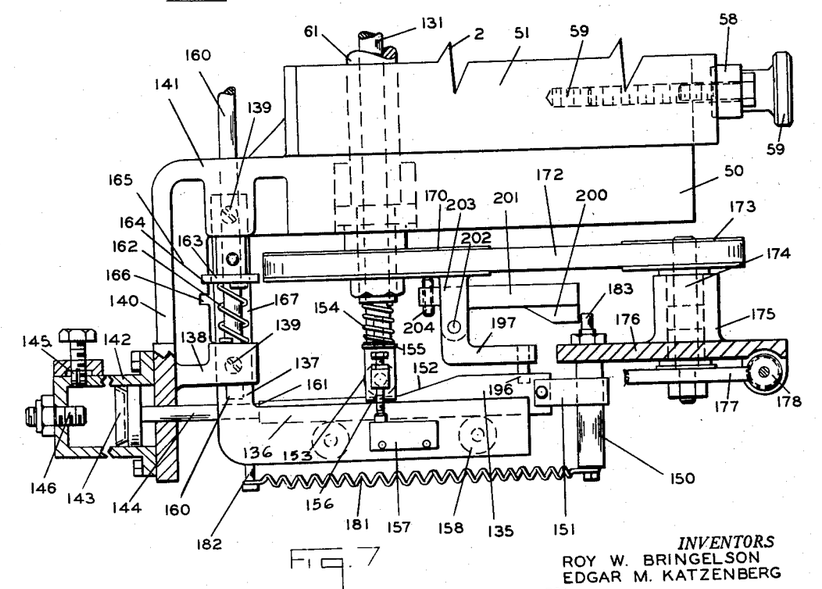
Figure 7 is a detail partly in vertical section taken along line 7—7 of Figure 6 showing the pattern raising cam mechanism and the traverse drive mechanism.

To adjust the standard 50 transversely of the machine along the guide plate 51, the arrangement shown in Figures 1 and 7 is provided. This arrangement comprises a screw mounting lug 58 which is bolted to one end of the guide plate 51. This lug 58 extends rearwardly (Figure 1) and overlaps one side edge of the standard 50 and is provided with an adjusting screw 59 rotatable but axially fixed therein. The inner end of this screw is threaded into the adjacent end of the standard 50. Obviously, by proper rotation of the screw 59 the standard 50 may be adjusted transversely of the machine in either direction on the guide plate 51.

Supported on the upper end of the standard 50 for swinging movement in a horizontal plane is a head-supporting yoke 60 as shown in Figures 1, 2, and 3. This yoke 60 is mounted on the standard 50 for swinging movement in a horizontal plane by means of a vertical sleeve 61 which is rotatably mounted in ball bearings 62 and 63 on the standard 50 at the upper and lower ends thereof respectively. The yoke 60 is keyed to the upper end of the sleeve 61 which projects up from the standard 50.

The yoke 60 extends forwardly over the rear portion of the bowl 29. The forward ends of the arms of the yoke carry the head bearings 64 which are adapted to support the head 65 for swinging movement vertically on the yoke 60. The rear edge of the main part of the head 65 is keyed on the transverse pivot pin 68 which is rotatable in the yoke bearings 64, it being understood that the rear portion of the head 65 is disposed within the arms of the yoke 60. Thus, the head 65 is mounted for vertical swinging movement about the axis of the pivot pin 68.

Latch mechanism is provided for holding the head 65 in its raised position when it is swung upwardly about the pivot axis 68 and for releasing it when desired so that it can swing downwardly about the pivot axis 68.

Associated with the head 65 and the yoke 60 is latching and raising means serving to permit downward swinging of the head during the edging operation but which will function to raise the head when the operation is completed. This means is shown best in Figures 1 and 5.

It will be noted in Figure 1 that there is provided a sleeve 70 which is rotatable on the pin 68 and which has a rigid handle 71 extending upwardly therefrom. Extending upwardly radially from the sleeve 70 is a latch-actuating lug 72 which is integral therewith. This lug 72 is disposed alongside the forward end of a plunger rod 73 (Figures 1 and 5) behind a cap 74 provided on the forward end of the rod. This rod 73 is slidably mounted in the forward end of a cylinder 75 which is formed on the upper surface of the yoke 60. Within the cylinder 75, the rod 73 carries a piston 76 which is slidably mounted in the cylinder. Ahead of the piston 76, within the cylinder, is a compression spring 77 which surrounds the rod 73. This compression spring 77 normally tends to move the piston 76 rearwardly in the cylinder 75.

To keep the plunger rod 73 forwardly when desired so as to permit downward swinging of the head 65, a bell crank latch member 78 of triangular form is provided and is pivoted at its one point to the forward end of the cylinder 75 as indicated at 79. The forward point of this latch member 78 carries a roller 80 which is adapted to snap down behind the cap 74 into contact with the rod 73 when the latch is engaged, it being noted that the axis of the roller is above the axis of the pivot 79. The upper point of this triangular latch member 78 is provided with a fixed support member 80a and a stop screw 84 is threaded rearwardly therethrough. The rear end of this screw 84 is engaged by the forward end of the rod 81 which is connected to the coil of a solenoid 82 which is supported on top of the cylinder 75 with its axis parallel thereto.

When the handle 71 is pulled forwardly to swing the head 65 downwardly about the pivot axis 68, the lug 72 will engage the cap 74 on the rod 73 and pull the piston 76 forwardly in cylinder 75 against the force exerted by the spring 77, compressing this spring. If the solenoid 82 is energized at this time, it will tend to swing the roller 80 downwardly so that it will snap behind the collar 74 when the rod 73 moves forwardly sufficiently. Thus, the solenoid actuated latch 78 will lock the rod 73 in the forward position shown in Figure 5 when the solenoid is energized and the handle 71 is pulled forwardly.

Figure 5:
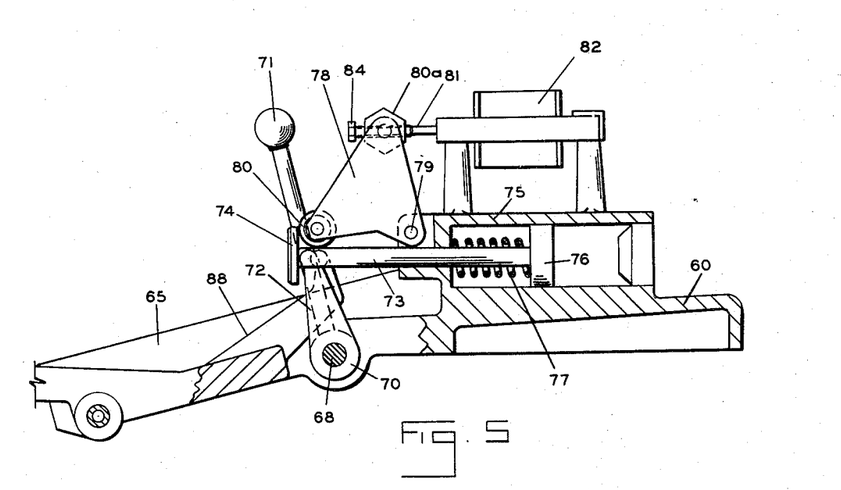
Figure 5 is a detail in vertical section, taken along line 5—5 of Figure 1, of the head-raising solenoid and associated mechanism.

Provided on the head 65 on the opposite side of the rod 73 is a head-raising lug 88 which is upstanding from and integral with the head 65. This lug 88 is adapted to be engaged by the cap 74 when the head is to be raised but normally during contact of the lens blank L with the abrading wheel 32, the upper end of the lug 88 will be spaced from the cap 74 as shown in Figure 5, so as to permit downward movement of the outer end of the head about the pivot axis 68. Obviously, upward movement will be permitted since the upper end of the lug 88 can swing rearwardly away from the cap 74 at any time. Thus, any necessary vertical movement of the head 65 about the pivot axis 68 will be permitted during the edging operation.

Assuming that the solenoid 82 is energized and that the latch mechanism is in the condition shown in Figure 5, as soon as the solenoid is deenergized, the latch 78 will be permitted to swing upwardly, about the pivot 79, since the spring 77 will tend to pull the cap 74 rearwardly and this will act on the roller 80 to lift the latch. This will cause the cap 74 to exert a pull on the upper end of the lug 88 and, therefore, to swing the head 65 upwardly about the pivot 68.

Figure 4:
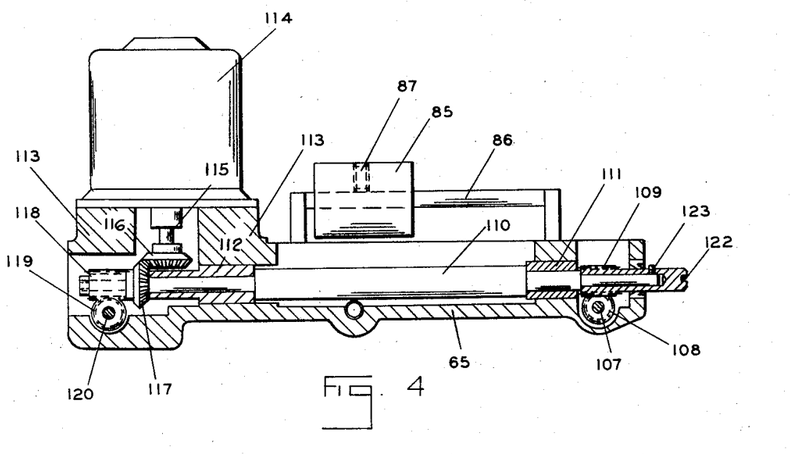
Figure 4 is a detail in vertical section taken along line 4—4 of Figure 1 through the drive mechanism for the lens blank.

To aid in holding the head 65 down when it is released by the latch mechanism, suitable additional weight may be provided on the head. For example, as shown in Figures 1, 3 and 4, the head 65 may be provided with an additional weight 85, which is adjustable on a rod 86, secured to the head, forwardly and rearwardly relative to the pivot axis 68 of the head. The weight 85 may be set in adjusted position on the rod 86 by means of a set screw 87. Additional weights may be provided on the head 65 if necessary.

Figure 10:
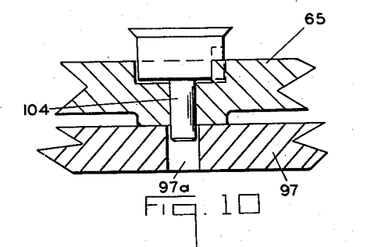
Figure 10 is a detail in section taken along line 10—10 of Figure 1, of locking means provided for the lens blank chuck operating lever.

The forward end of the head 65 is provided with a lens chuck 90 for gripping a lens blank L for rotation in a vertical plane perpendicular to the horizontal plane of the abrading wheel 32. As shown in Figures 1 and 2, this chuck 90 comprises a lens blank gripping chuck face 91 which is adapted to frictionally engage one surface of the lens blank L and which is rotatably carried by means of an antifriction bearing 92 on a pin 93. This pin 93 is mounted for axial movement in a forward extension 94 (Figure 1) of the head 65. The pin 93 is slidably disposed in a socket 95 (Figures 1 and 2) in the extension 94. A compression spring 96 is disposed within the socket 95 and engages the inner end of the pin 93. To move the pin 93 so that the chuck face 91 engages or releases the lens blank L, a gear segment lever 97 (Figure 1) is provided which is pivoted at 98 to the head extension 94 for swinging movement in a horizontal plane. The inner end of the lever 97 is provided with a segmental gear portion 99 which meshes with an idler pinion 101 that meshes with a rack section 100 formed on the forward side of the pin 93. It will be apparent that if the lever 97 is rocked about the pivot 98, the chuck face 91 will be engaged with or disengaged from the adjacent face of the lens blank L. For adjusting the force exerted outwardly on the pin 93, a screw 103 is threaded into the outer end of the socket 95 into engagement with the spring 96. By threading the screw 103 into and out of the socket, the force exerted by the spring 96 will be varied. For holding the lever 97 in lens blank releasing position, the locking pin arrangement of Figure 10 may be used. The head 65 carries a weighted pin 104 at a suitable location as shown in Figure 1. The pin 104 cooperates with an opening 97a in the lever 97. When the lever 97 is swung into blank releasing position the pin 104 will be above the opening 97a and can drop thereinto to lock the lever in such position. The pin 104 can be lifted when desired to release the lever 97.

The other chuck face 105 for engaging the opposite surface of the lens blank L is non-rotatably mounted by a unit 106 on a driven shaft 107. This shaft 107 is part of the means which is used for driving the lens blank L about its axis and which is shown best in Figures 1, 2 and 4. The shaft 107 carries a worm gear 108 which meshes with a worm sleeve 109 keyed on the forward end of a shaft 110. This shaft 110 extends rearwardly at one side of the head 65 beyond the pivot pin 68. The forward end of the shaft 110 is rotatably disposed in a bearing sleeve 111 mounted in the head 65 and its rear end is rotatably disposed in a bearing sleeve 112 mounted within the gear housing 113 on the member 65. The housing 113 carries the electric motor 114 which has its drive shaft 115 vertically disposed. The lower end of this drive shaft 115 is provided with a bevel pinion 116 keyed thereon which meshes with a bevel pinion 117 formed as a part of a worm sleeve 118 which is keyed on the rear end of the shaft 110. Thus, the shaft 110 is driven by the motor 114. The worm 118 meshes with a worm gear 119 which is disposed on a shaft 120 that is disposed transversely of the shaft 110. This shaft 120, as shown in Figure 1, projects from the gear housing 113 and receives the pattern 125 which is non-rotatably mounted on the shaft 120 in a manner which will be explained later.

The gear sleeve 109 at the forward end of the shaft 110 (Figure 4) extends forwardly and projects from the member 65 and is provided with a slot 122 for receiving a screw-driver by means of which it may be rotated about its axis. This member 109 normally is keyed to the reduced forward extension of the shaft 110 by means of a set screw 123 which can be released to permit the sleeve 109 to be rotated on the shaft extension. This will drive the shaft 107 without driving the shaft 110 and, therefore, can be used initially in rotating the chucked lens blank L about its axis to a predetermined position relative to the pattern 125 which is fixed relative to the axis of the shaft 120. It will be noted from Figure 3 that the axis of rotation of the lens blank L is substantially ahead of the pivot axis 68 for the vertical swinging of the head 65 and that the axis of rotation of the pattern 125 is substantially behind the pivot axis 68.

It will be noted from Figure 2 that the pressure line 23 from the coolant supply pump 22 has a downwardly turned end 126 which is disposed directly over the lens blank L held by the chuck 91. Thus, coolant will be supplied to the contacting edge of the lens blank L and the face of the abrading wheel 32. Obviously, this line 23 will be provided with one or more flexible sections to permit the necessary swinging of the head 65 both in a horizontal and in a vertical direction.

To control the vertical swinging movement of the head 65 and the lens blank L carried at the forward side thereof by means of the pattern 125 carried at the rear side thereof as shown in Figure 3, a pattern follower 127 is provided. This pattern follower 127 is a flat plate which engages the upper edge of the pattern 125 as it is rotated about the axis of the shaft 120. The follower 127 is carried by a mounting pin 128 which is mounted for vertical adjustment in the outer end of an arm 129 and is held in vertically adjusted position in that arm by means of a set screw 130. The arm 129 projects forwardly from the upper end of a vertically disposed control rod 131 to which it is keyed to prevent rotative movement thereon and to which it is clamped to prevent vertical movement thereon. The control rod 131 is mounted for vertical sliding movement within the pivot sleeve 61 which is disposed within the yoke 60 and the bearings 62 of the standard 50.

Means is provided for moving the control rod 131 vertically to control the vertical position of the pattern follower 127. This means is illustrated best in Figures 3 and 7 and is associated with a head-traversing mechanism which is also illustrated in these figures.

This control rod moving means comprises the reciprocable inclined cam bar 135 which is mounted slidably in a horizontal guideway 136 formed on the lower portion of an L-shape support 137. The upstanding portion of this support is in the form of a sleeve which extends upwardly into a socket formed in a bracket 138 and is secured in position therein by a set screw 139. The bracket 138 is formed as a part of an arm 140 which depends from an extension 141 formed on one side of the standard 50. Removably attached to the lower end of the arm 140 is the cylinder 142 of an air dash-pot. This cylinder 142 has slidably mounted therein the piston 143 which is connected to a rod 144 that extends outwardly from the end of the cam bar 135. The cylinder 142 is provided with a screw-controlled outlet valve 145 which can be adjusted to determine the speed of movement of the piston 143 to the left as viewed in Figure 7, and an adjustable stop screw 146 is threaded into the end of the cylinder for stopping movement of the piston. Thus, this air dash-pot will determine the speed of movement of the piston 141 to the left and can be adjusted to properly position such movement.

For reciprocating the cam 135 in its guideway 136 it is connected to a depending pin 150, which will be moved in a manner to be described later, and this connection is made by means of a U-shape connecting strap 151 which is fastened to the end of the cam 135 and extends around the pin 150. This provides a loose connection for pulling the cam bar 135 with the pin 150 to the right of Figure 7 and when the pin 150 moves to the left the pin will strike the end of the cam and move it to the left. This will cause the inclined surface 152 of the cam to engage the roller 153 on the lower end of the control rod 131 to move the rod 131 vertically. This will move the pattern follower 127 vertically (Figure 3) to a predetermined extent at the proper instant so as to permit the lens blank L, as will be later explained, to drop into one of the beveling grooves 32a which are formed in the face of the wheel 32 when it is desired to produce a beveled edge on the lens. A compression spring 154 is provided around the lower end of the rod 131 and engages the collar 155 fixed thereto so as the tend to move the rod downwardly. Also mounted on the lower end of the rod 131 is an adjustable depending screw 156 which is provided for engaging the button of a switch 157. This switch is provided for a purpose which will be described later and is open until the screw 155 engages and depresses the button thereof. The switch 157 is carried on the side of the arm 137 as shown in Figure 7. It will also be noted in this figure that the arm 137 carries the bearing rollers 158 in the bottom of the guideway 136 so as to reduce friction which would be created by the rod-carrier roller 153 bearing on the upper edge of the cam bar 135.

When the machine is being used for edging a rimless lens blank, as will be later explained, it is desirable to prevent the lens blank from droping into any of the beveling grooves 32a on the face of the abrading wheel 32. Therefore, for such a purpose, means is provided for blocking the cam bar 135 to prevent movement thereof to the left to any appreciable extent. This means comprises a latching rod 160 which is normally in its uppermost position shown in Figure 7 but which can be moved downwardly to a position where it will engage a shoulder 161, formed on the end of the cam bar 135 where it connects with the rod 144. This rod 160 is mounted for vertical movement in the upstanding sleevelike portion of member 137 and in the extension 141 of the standard 50. Ordinarily, the rod 160 is held in its uppermost position by means of a compression spring 162 which surrounds it and which is disposed between a collar 163 fixed on the rod and the bracket 138. The collar 163 is provided with a radial notch 164 (Figure 6) which straddles a vertical guide rib 165 on the extension 141 provided with a locking notch 166 at its inner edge. This locking notch 166 is adapted to cooperate with the collar 163.

It will be noted that if the rod 160 is pushed downwardly to bring the collar 163 to the level of the notch 166 and is then rotated to bring the notch 164 to one side or the other of the rib 165, the rod 160 will be locked in its lowermost position by cooperation of the collar 163 and the notch 166. This will move the lower end of the rod 160 into a position where the shoulder 161 will engage it whenever the cam bar 135 is moved slightly to the left. Thus, this will prevent the inclined surface 152 from being moved to any extent below the roller 153, and therefore, will prevent vertical movement of the control rod 131 and the follower 127. To release this cam blocking means, it is merely necessary to rotate the collar 163 until the notch 164 again aligns with the rib 165 and allow the spring 162 to return the rod 160 to its original vertical position.

Figure 6:
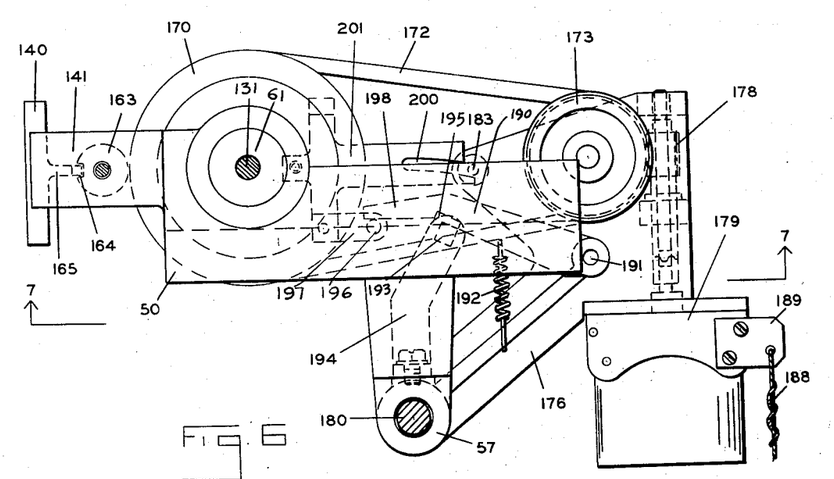
Figure 6 is a detail in horizontal section taken on line 6—6 of Figure 3, showing the traversing drive mechanism and associated latch mechanism.

The traversing mechanism is illustrated best in Figures 3, 6 and 7 and comprises means for swinging the yoke 60 about the vertically disposed sleeve 61 carried by the standard 50 so as to move the lens blank L, carried by the head 65, inwardly towards the center of the wheel 32. This means includes the pulley 170 which is keyed to the lower depending end of the sleeve 61 directly below the lower bearing 63 carried by the standard 50. The pulley 170 is driven by means of a belt 172 as shown in Figures 3 and 7. This belt 172 passes around a driving pulley 173.

To provide for engaging and disengaging the belt drive between the two pulleys 170 and 173, the pulley 173 is mounted for movement towards and from the pulley 170, For this purpose, the pulley 173 is keyed on the upper end of a shaft 174 which is rotatably mounted by a bearing 175 provided on a shelf 176. The lower end of this shaft 174 has keyed thereon a worm gear 177 which is driven by a worm 178 that is driven by the electric motor 179. The motor 179 is also attached to the shelf 176. The shelf 176 is mounted on the sleeve 57 carried by the standard 50, which was previously referred to and which is shown in Figure 3. For mounting the shelf 176 on the sleeve 57 a pivot pin 180 is clamped in the sleeve 57 and rotatably mounted on its lower end is the shelf 176. Thus, the shelf 176 can swing in such a manner that the axis of the pulley 173 will move towards or from the axis of the pulley 170.

For swinging the shelf 176 so that the pulley 173 will move towards the pulley 170, there is provided a tension spring 181. This spring is connected at one end to a depending pin 182, which is carried by the support 137 that is fixed to the standard 50, and its other end is connected to the lower end of the pin 150, previously mentioned, which depends from the shelf 176. Thus, this spring 181 will tend to swing the shelf about the axis of the sleeve 57. The pin 150 is clamped to the shelf and is provided with an upstanding pin extension 183 above the shelf 176.

The shelf 176 is swung about its pivot pin 180 (Figures 3 and 6), to a position where the belt 172 is tightened, against the resistance of the spring 181 by means of a hand lever 185 of the bell crank type which is pivoted at 186 to the base 26 of the machine adjacent its forward edge as shown in Figure 3. Normally, a spring 187 tends to swing this lever 185 rearwardly. The lever 185 is connected by a cable 188, running rearwardly from the location of the lever 185 at the front of the machine to the rear of the machine where it is connected to a lateral extension 189 provided on the shelf 176. When the handle 185 is pulled forwardly, the shelf 176 is latched in such a position that the belt 172 is maintained taut until the desired traversing action that moves the lens blank inwardly to the desired extent towards the center of the wheel 32 is completed, at which time the shelf 176 will be released so that the spring 181 will swing it about the pivot 180 to release the belt 172.

The latching means for latching the shelf 176 in belt-tightening position comprises a detent lever 190 which is pivoted to the lower surface of the shelf 176 at the point 191. A tension spring 192 is connected to the lever 190 and the shelf 176 (Figure 6) for swinging the lever 190 towards a latch pin 193 which has a lower end of square cross-section. This pin 193 is mounted on the outer end of an arm 194 which is bolted to the side of the depending sleeve 57 as shown in Figures 3, 6, and 7. Thus, the latch pin 193 is carried by the fixed standard 50 and the detent lever 190 is carried by the swingable shelf 176. The detent lever is provided with a latching notch 195 for cooperation with the latch pin 193. When the belt 172 is tightened by swinging the shelf 176 forwardly by a forward pull on the hand lever 185, the detent lever 190 will be so positioned that the latching notch 195 will receive the latch pin 193. The shelf 176 will be held in this position until the detent 190 is swung away from the pin 193. This is accomplished by means of a latch releasing pin 196 which depends from the lower horizontal portion of an L-shaped arm 197. This arm 197 is rigidly secured to and depends from the pulley 170. The pulley 170 is driven very slowly, when the motor 179 is energized, and as it swings around toward the position shown in Figure 6, the pin 196 will strike the extending end 198 on the detent lever 190 so as to move the lever rearwardly to disengage the detent from the pin 193. This will permit the spring 181 to swing the shelf 176 so that the axis of the pulley 173 will be moved towards the axis of the pulley 170 thereby loosening the belt 172 from such pulleys and interrupting the traversing drive which during its engagement swings the yoke 60 and the head 65 about the axis of the sleeve 61.

Swinging of the shelf 176 in this manner causes the pin 150, which depends therefrom, to strike the inner end of the cam bar 135 and to force it quickly to the left causing the inclined surface 152 thereof to move beneath the roller 153 and to raise the pattern follower control rod 131. The speed of movement of the cam bar 135 is dampened by the air dash-pot which includes the piston 143 connected thereto and this speed can be controlled as previously indicated by setting of the valve 145. This movement of the cam bar 135 is permitted as long as the latching rod 160 is not in position to interfere with it, as previously indicated.

To prevent lateral swaying of the yoke 60 and the head 65 carried thereby during the release of the belt drive for the traversing mechanism, the pin 183 on the casting 176 cooperates with a cam channel 200 formed on the outer end of an arm 201 carried by the pulley 170. This channel 200 is on the lower side of the arm 201 and extends for a portion only of the length inwardly from the end thereof. The arm 201 is pivoted for vertical swinging movement about a pivot point 202 at the lower end of a depending lug 203 which is rigid with the pulley 170. As the detent 190 is released from the latch pin 193, the pin 183 will be so located that it will move into and travel through the cam channel 200. During its travel through this channel the lens blank L will be held from radial fluttering movement relative to the wheel 32. However, as soon as the pin 183 passes through this channel 200, any required lateral or radial movement of the lens blank relative to the wheel 32, for example when the blank is in one of the grooves 32a, will be permitted. The arm 201 is pivoted for vertical movement about the pivot 202 so that when the casting 176 is swung back to its original position by the hand lever 185, the pin 183 can move the lever 201 upwardly as it moves forwardly past such lever to the position it normally occupies. A set screw 204 is provided at the inner end of the lever 201 beyond the pivot 202 for engaging the lower surface of the pulley 170 so that the arm 201 can be adjusted accurately into an exact normal horizontal position.

Figure 8:
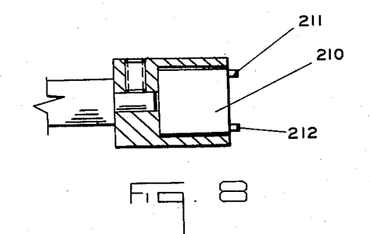
Figure 8 is an enlarged detail in side elevation of the chuck for mounting the pattern on its supporting spindle.
Figure 9:
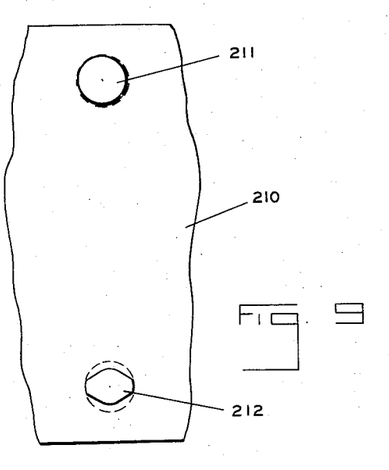
Figure 9 is a face view of the chuck showing the shape of the mounting pins thereof.

As previously indicated, the lens blank L is mounted on the drive shaft or spindle 107 so that it will rotate therewith but will not rotate relative thereto. The usual mounting for the lens blank may be provided for this purpose. Also, as previously indicated, the pattern 125 rotates with the drive shaft spindle 120 and is mounted thereon in such a manner that it cannot rotate relative thereto. For this latter purpose, we provide a novel chuck arrangement which is shown in Figures 8 and 9.

This chuck arrangement is a combination magnetic and mechanical chuck. It consists of the permanent magnet 210 which suitably carries a pair of vertically spaced pins 211 and 212 which project outwardly from the face thereof. The pattern 125 will be held by magnetic attraction against the face of the magnet 210 since the pattern is also of magnetic material. To prevent misalignment of the pattern 125 as its edge engages the follower 127, the pins 211 and 212 fit into circular openings formed in the pattern 125 in correspondingly spaced relationship. The pin 211 is of circular cross-section whereas the pin 212 is of substantially diamond cross-section. The openings in the pattern are indicated by dotted lines in Figure 9 and it will be noted that the circular pin 211 will snugly fit in its cooperating circular opening. The pin 212 will fit tightly into its associated circular opening insofar as transverse direction is concerned but the dimension in the direction of spacing of the pins 211 and 212 (Figure 9) will be less than the diameter of such opening. Thus, it will be easier to insert the pins 211 and 212 in the cooperating openings and the spacing of these openings will not have to be so exact. The pattern 125 will be held against the face of the chuck by magnetic attraction and will be prevented from shifting relative thereto as its edge contacts with the follower 127 by the pins 211 and 212.

Figure 11:
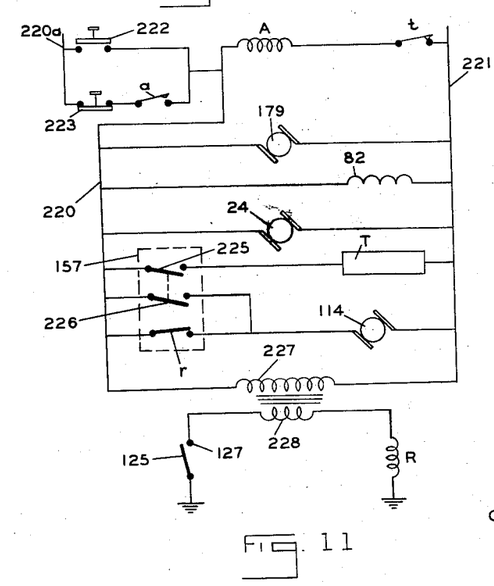
Figure 11 is a diagrammatic view of the circuit which controls all electric units of the machine except the abrading wheel drive.

The circuit for all units of the machine with the exception of the driving motor 40 for driving the abrading wheel 32, which circuit was previously described, is illustrated schematically in Figure 11. In this figure, the main lines are indicated by the numerals 220 and 221, the line 220 connecting to a branch circuit 220a which connects to the source of power along with the line 221. For controlling the line 220 a main switch 222 is provided which is adapted to be closed to energize the entire circuit. Also controlling this line is an emergency off switch 223, which is normally closed, and the contact a of a relay A, the switch 223 and contact a being connected in parallel with the switch 222. The coil of the relay A along with the contact t of a relay timer T are connected in a line across the lines 220 and 221. Also connected across these lines are the traverse motor 179, the head raise solenoid 82, and the pump motor 24, which are all connected in parallel with each other. Also connected in parallel with the units just mentioned across the lines 220 and 221 is the timer T which is controlled by one movable contact 225 of the switch 157 which is actuated by the pattern control rod 131. The switch 157 also includes another movable contact 226 which is ganged to the contact 225 and which is connected to the lens blank driving motor 114 and to the line 220. Connected parallel with the contact 226 between the line 220 and the motor 114 is a contact r of the relay R. The other side of the motor is connected to the line 221. Also connected across the lines 220 and 221 is the primary coil 227 of a stepdown transformer which includes the secondary coil 228. The circuit for the secondary coil 228 of the transformer includes the coil of the relay R and the cooperating contacts which include the pattern 125 and the follower 127, these latter members being suitably connected in the circuit. Thus, the circuit which includes the pattern 125 and the follower 127 is a low-voltage circuit to reduce sparking between these contacts.

In using our machine, if the edge of the lens blank is to be beveled, the traversing mechanism is first adjusted so that the traverse will terminate over one of the grooves 32a in the abrading wheel 32. Three of these grooves are shown but it is to be understood that the number could be varied. With the three grooves shown, the outermost one is preferably for grinding a beveled edge suitable for a minus lens, the intermediate groove for a plano lens, and the innermost groove for a plus lens, it being understood that the side surfaces of the grooves are also diamond surfaces. To adjust the traverse mechanism to select the proper groove 32a for the final edging operation if the edge is to be beveled, the screw 59 is turned to move the standard 50 to a selected position on the guide plate 51. The lens blank L will be mounted in the chuck 90 at this time and the pattern 125 will be mounted on the spindle 120. Proper adjustment will be made by means of the slotted sleeve 109 to properly relate the rough lens blank angularly to the pattern 125.

The operator now throws the switch 43 to start the motor 40 in operation to drive the wheel 32. Next, the operator pulls the traverse handle 185 forwardly thereby engaging the traverse drive by tightening the belt 172. The head 65 is swung about the pivot 61 until it is in the desired starting position radially over the wheel 32, the belt 172 slipping on the pulleys 170 and 173 to permit this. The start switch 222 is then pushed to energize the circuit. This energizes the traverse motor 179, the head raise solenoid 82 and the pump 24. If, at this time the pattern 125 is in contact with the follower 127, the lens blank drive motor 114 will be energized since the coil of the relay R will be energized and the contact r thereof will be closed. The cam bar 135 will have been pulled to the right by pulling on the traverse lever to engage the traverse drive and, therefore, since the pattern follower control rod 131 will be in its lowermost position, the switch 157 will be open at this time so that the timer T will not be functioning. The head raise latch handle 80 is pulled forwardly and this will engage the latch member 78 since the solenoid 82 is energized releasing the head 65 for vertical movement. The traverse drive will function to slowly drive the pulley 170 and swing the head 65 in a horizontal plane about the axis of the pivot sleeve 61. Whenever the pattern 125 is in contact with its follower 127 the lens blank L will be driven about its axis in a vertical plane and the pattern 125 will be synchronously driven but the motor 114 will not be energized for this purpose when the pattern and follower are out of contact with each other due to insufficient material being ground off the lens blank at the angular position where it contacts the wheel 32. Vertical movement of the lens blank L so that it will contact with the upper face of the wheel 32 at the necessary intervals will be produced by swinging the head 65 in a vertical plane about the axis of the pin 68 under the control of the pattern 125, it being understood that at this time the head is free to move vertically.

The machine will continue to function in this manner until the traversing mechanism rotates the pulley 170 to such a position that the pin 196, carried thereby, strikes the end of the detent lever 190 (Figure 6) and releases it from the latch pin 193. At this time, the traverse belt 172 will be loosened and the traverse drive will be stopped. If the original position of the plate 51 on the standard 50 has been properly adjusted, the lens blank L will now drop into the selected groove 32a since release of the belt 172 simultaneously causes the cam bar 135 to move the control rod 131 upwardly thereby moving the pattern follower 127 upwardly so as to permit the pattern to follow it and allowing the head to pivot downwardly dropping the lens blank L into the groove. During movement of the lens blank L inwardly towards the center of the wheel 32, which is substantially radially but in a slight arc about the pivot 60, it may move over one or more of the grooves 32a and will be prevented from dropping thereinto since the follower 127 will not be moved upwardly until the traverse is completed at which time the lens blank L will be over the selected groove 32a. As the lens blank drops into the selected groove 32a, the switch 157 is closed since the control rod 131 moves upwardly. This will complete the circuit to the timer T through the contact 225 and to the lens blank drive motor 114 through the contact 226. The contact r may or may not be closed depending on whether the pattern 125 is in contact with the follower 127. The timer will now start timing and at the completion of its cycle it will break the entire circuit at the contact t. This will stop all operation of the machine, except the wheel drive motor 40. Deenergizing the solenoid 82 will release the latch 78 and allow the head raising plunger rod 73 to move rearwardly causing the cap 74 to pull on the lug 88 to raise the head 65 about the pivot 68 so as to lift the lens blank L from the wheel 32.

If the machine is to edge a lens blank for a rimless lens of which the edge is not to be beveled, the machine is set as before so that the lens blank will traverse a predetermined area of the wheel 32 but it is further set so that the lens blank will not drop into any of the grooves 32a at the completion of the traverse. This latter setting is made by using the rod 160 to set the lower end thereof in position to limit movement of the cam bar 135 to the left. When the traversing drive is released, the inclined surface 152 will move only slightly under the roller 153 thereby raising the follower 127 only slightly which will permit grinding off only a slight amount of the stock on the edge of the lens blank to finish a flat edge. This slight upward movement of the control rod 131 will also permit closing of the switch 157 so that the timer T will be energized and the circuit will be broken after a short interval.

It will be apparent from the above description that a lens blank edging machine is provided which is fully automatic to perform in one continuous operation the edging of a lens blank from a rough oversive blank to the finished blank. The machine will reproduce on the blank an outline pattern with high accuracy and will form the edge of the blank with high accuracy to produce an edge of preselected cross-sectional shape. The machine can be easily and quickly adjusted to produce bevel edges of different types or flat edges. The machine is capable of high-speed operation, smoothly, and without undue wear on parts so that the edging operation can be performed efficiently and quickly and, therefore, economically. Truing requirements for the abrading wheel are kept at a minimum because most of the grinding of the edge is accomplished before the blank drops into the final beveling groove or reaches the flat area where the final edging is accomplished. The machine requires practically no effort by the operator who merely needs to mount the blank on the machine, make a few adjustments, and actuate the traverse lever and a switch to start the operation of the machine.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A lens blank edging machine comprising an abrading wheel mounted for rotation about a substantially vertical axis and having a substantially flat upper horizontally disposed abrading surface, means for rotating said wheel about said axis, a yoke disposed above said wheel and mounted for rotation about a vertical axis spaced from and parallel to the axis of rotation of said wheel, a lens blank supporting head mounted for vertical swinging movement about a horizontal axis on said yoke, means for supporting and driving a lens blank and an associated pattern on said head so that the edge of the lens blank will contact with said abrading surface of the wheel, means for controlling vertical swinging movement of said head, said means comprising a follower supported independently of said head and engaging the edge of said pattern, means for traversing the lens blank across said abrading surface, said means comprising traverse mechanism which gradually swings said yoke about its axis to swing the head with the lens blank supported thereby across said wheel, said traverse mechanism comprising a rotatable axis member on which said yoke is fixed, means for rotating said axis member, and means for interrupting rotation of said axis member.

2. A lens blank edging machine according to claim 1 in which said axis member has a driven pulley keyed thereon, a driving pulley and a driving belt passing around both of said pulleys, and means for moving the axes of said pulleys towards or away from each other to loosen or tighten the belt thereon to engage or disengage the traverse drive.

3. A lens blank edging machine according to claim 2 in which the drive pulley is carried by a support movable towards the driven pulley, a spring tending to move the said support towards the driven pulley, and latch mechanism preventing said movement.

4. A lens blank edging machine according to claim 3 in which the latch mechanism is released by means actuated by rotation of said driven pulley.

5. A lens blank edging machine according to claim 2 including means operated by release of the traverse drive to move said pattern follower.

6. A lens blank edging machine according to claim 5 in which said abrading surface is provided with a plurality of radially spaced continuous beveling grooves formed therein, each of which can receive the edge of the lens blank, said means for interrupting said axis member selecting any one of said grooves or a position on said abrading surface as the selected position for said traverse of the lens to be interrupted, in which said follower is supported by a movable support, means for preventing the edge of said blank from dropping into any of said grooves except the selected one, said last-named means comprises a cam engaging said support to move it upon release of the traverse drive.

7. A lens blank edging machine according to claim 6 including latch mechanism selectively operable to lock said cam for limited movement only.

8. A lens blank edging machine according to claim 7 including means operable by the limited movement of said cam to raise said head to move the lens out of contact with said wheel.

9. A lens blank edging machine comprising an abrading wheel having an abrading surface substantially normal to its axis of rotation, means for rotating said wheel about said axis, means for supporting a lens blank to be edged in a plane substantially normal to the plane of said abrading surface of the wheel, means for rotating the lens blank about an axis substantially normal to the axis of said wheel, means for producing relative movement between said lens blank support and said wheel to cause the edge of the lens blank to traverse the said abrading surface of the wheel, said abrading surface being provided with a plurality of radially spaced continuous grooves formed therein, each of which can receive the edge of the lens blank and form thereon an edge of predetermined cross-section, said means for producing relative movement between said lens blank support and said wheel including means for interrupting said movement when the lens blank reaches a selected groove or area on said abrading surface, and means for preventing the edge of said blank from dropping into any of said grooves except the selected one.

10. A lens blank edging machine according to claim 9 including means for supporting the lens blank support for movement towards and from said abrading surface, and a lens blank pattern for controlling said movement.

11. A lens blank edging machine comprising an abrading wheel having a flat abrading surface substantially normal to its axis of rotation, means for rotating said wheel about said axis, including a head for supporting a lens blank to be edged in a plane substantially normal to the plane of said abrading surface of the wheel, means for rotating the lens blank on the head about an axis substantially normal to the axis of said wheel, means for producing relative movement between said lens blank supporting head and said wheel to cause the edge of the lens blank to traverse the said abrading surface of the wheel, said last-named means including means for interrupting said movement when the lens blank reaches a preselected position on said abrading surface, said abrading surface being provided with a plurality of radially spaced continuous beveling grooves formed therein, each of which can receive the edge of the lens blank, the means for interrupting the traverse movement comprising adjustable means to select any one of said grooves or a position on said flat abrading surface as the selected position where said traverse of the lens is interrupted and comprising means for adjusting the head transversely of the wheel, said lens blank supporting head being mounted for pivotal movement in a vertical plane relative to the wheel, a lens blank pattern for controlling said movement, said lens blank and the pattern being coaxially arranged on the head and being driven synchronously, a follower for cooperating with the pattern carried independently of the head in normally fixed position but being movable vertically, means for normally permitting the head to swing downwardly to cause the lens blank edge to contact said abrading surface of the wheel, means for moving the follower vertically to permit downward swinging of the head to drop the edge of the lens blank into a selected groove of said abrading surface, and means for swinging the head vertically to lift the lens blank from the abrading surface after the termination of the traverse movement.

12. A lens blank edging machine according to claim 11 including means for preventing action of said means for moving the follower vertically to prevent said downward swinging if the traverse of the lens is to terminate on the flat abrading surface.

13. A lens blank edging machine comprising an abrading wheel mounted for rotation about a substantially vertical axis and having a substantially flat upper horizontally disposed abrading surface, means for rotating said wheel about said axis, a yoke disposed above said wheel and mounted for rotation about a vertical axis spaced from and parallel to the axis of rotation of said wheel, a lens blank supporting head mounted for vertical swinging movement about a horizontal axis on said yoke, means for supporting and driving a lens blank and an associated pattern on said head so that the edge of the lens blank will contact with said abrading surface of the wheel, means for controlling vertical swinging movement of said head, said means comprising a follower supported by a movable support independently of said head and engaging the edge of said pattern, means for traversing the lens blank across said abrading surface, said means comprising traverse mechanism which gradually swings said yoke about its axis to swing the head with the lens blank supported thereby across said wheel, said traverse mechanism comprising a rotatable axis member on which said yoke is fixed, a traverse drive for rotating said axis member, said axis member having a driven pulley keyed thereon, a driving pulley and a driving belt passing around both of said pulleys, means for moving the axes of said pulleys towards or away from each other to loosen or tighten the belt thereon to engage or disengage the traverse drive, means operated by release of the traverse drive to move said pattern follower, said last-named means comprising a cam engaging said support to move it upon release of the traverse drive, latch mechanism selectively operable to lock said cam for limited movement only, means operable by the limited movement of said cam to raise said head to move the lens out of contact with said wheel, said last-named head raise means being solenoid actuated and the traverse mechanism being driven by an electric motor, and a circuit in which said solenoid and motor are connected, and a switch actuated by said cam to cause said circuit to actuate said head raise solenoid and to deenergize said traverse motor.

14. A lens blank edging machine according to claim 13 in which the lens blank drive is actuated by an electric motor connected in said circuit, a timer in said circuit for controlling said lens blank drive motor, said switch controlling said timer.

15. A lens blank edging machine according to claim 14 in which the circuit also includes said pattern and said follower which serve as an additional switch for controlling said lens drive motor.

References Cited in the file of this patent
UNITED STATES PATENTS

| | | |
|---|---|---|
| 615,089 | Murdock | Nov. 29, 1898 |
| 1,109,405 | Di Gianni | Sept. 1, 1914 |
| 1,269,680 | Bugbee | June 18, 1918 |
| 2,471,493 | Norton | May 31, 1949 |
| 2,565,624 | Phelon | Aug. 28, 1951 |
| 2,580,099 | Jaeger | Dec. 25, 1951 |
| 2,693,058 | Hagstrom | Nov. 2, 1954 |
| 2,693,063 | Dillon | Nov. 2, 1954 |
| 2,725,689 | Dexter | Dec. 6, 1955 |